Nov. 27, 1956  F. D. FRISBY  2,772,129
PISTON PACKING RING
Filed July 16, 1952
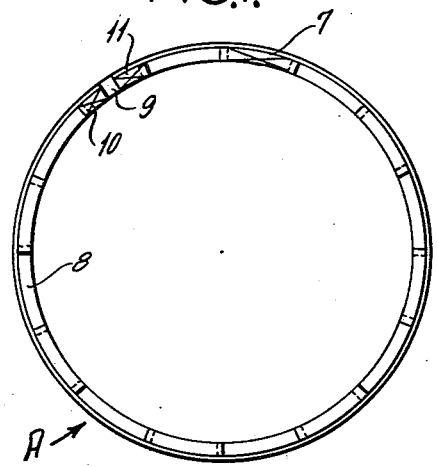
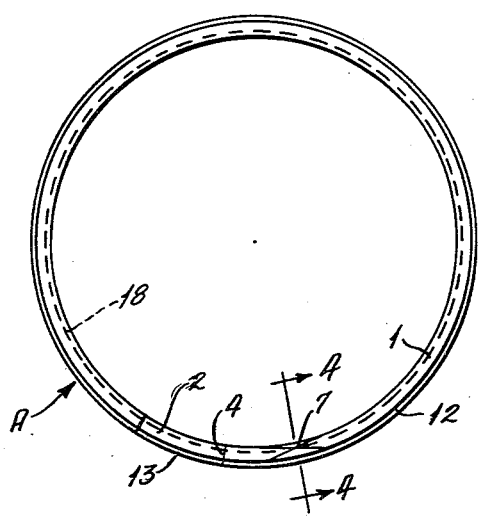
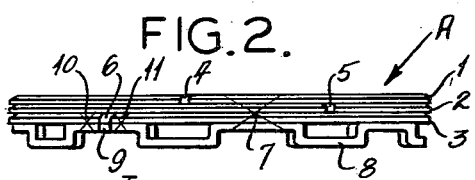
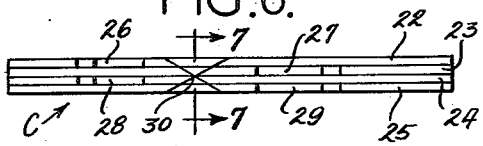
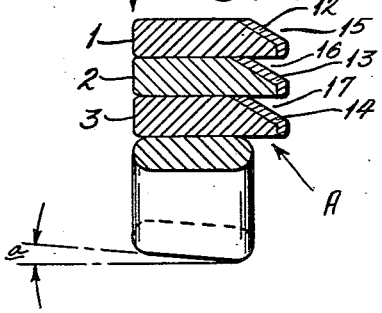
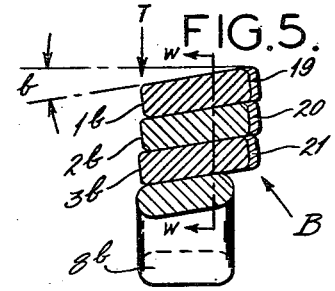
INVENTOR
FRANK D. FRISBY
By Gravely, Lieder, Woodruff & Dees
ATTORNEYS.

United States Patent Office 2,772,129
Patented Nov. 27, 1956

2,772,129

PISTON PACKING RING

Frank D. Frisby, St. Louis, Mo., assignor to Frisby Corporation, St. Louis, Mo., a corporation of Missouri Application July 16, 1952, Serial No. 299,100

18 Claims. (Cl. 309—45)

This invention relates to improvements in composite integrant piston packing rings of the general class described in my copending application Serial No. 114,028 filed September 3, 1949, now United States Patent No. 2,608,453, dated August 26, 1952.

This invention is embodied in a piston packing ring comprising a plurality of flexible sealing elements bonded together at one point in cooperative relation.

The principal object of the present invention is to provide a packing ring formed of a plurality of separate flexible sealing elements bonded or attached together at a point to create a positive instantaneous opposed and alternating reaction between the elements over their area of contact for the purposes hereinafter described.

Another object of this invention is to provide a piston packing ring having a plurality of individual sealing elements which can be easily assembled and bonded into a unitary piston packing ring having certain desired characteristics, each of said elements being selected for certain characteristics either individually or collectively in combination with the other elements, or both.

Another object is to provide a piston packing ring having a variable high degree of internal frictional reaction between the bonded sealing elements in operation. This action provides unusual resistance to ring collapse and improves the compression and oil control properties of the ring when forced to contract, or wind up, in a cylinder because of taper, torsion, or wear in the surface of the cylinder wall.

Another object is to provide a piston packing ring which has a pretorsioned form or shape at its free inside diameter, which is slightly less than the outside diameter of the piston head, to increase the frictional reaction between the bonded sealing elements as they are contracted to cylinder diameter.

Another object is to provide a piston packing ring in which the bonded sealing elements still retain their individual control of concentric circularity of sealing contact, circumferential unit pressure, and torsion action and which with a coating or plating applied to each element, produce a one piece ring assembly of high efficiency.

Still another object is to provide a piston packing ring formed of a plurality of sealing elements and a corrugated or vented spacer element bonded together in a selected position to create an improved combination compression and oil control ring in a one piece ring assembly.

This invention is embodied in a piston packing ring having a plurality of annular torsion sealing elements in concentric relation to each other, each of said elements having a gap therein, said gaps being positioned in a staggered formation, said elements being bonded together at one point.

The invention also consists in the combination and arrangements of parts hereinafter described and claimed.

The accompanying drawings form part of this specification and like numerals and letters refer to like parts wherever they occur.

Fig. 1 is a normal, full size scale bottom view of a combination compression and oil control ring bonded at the points indicated by the marks "X," the ring being shown in contracted form at normal cylinder diameter.

Fig. 2 is a side elevational view of the combination shown in Fig. 1 indicating the staggered positions of the gaps in relation to the primary bond and also showing the position of the secondary twin bond by the marks "X"; the width of the ring is shown enlarged with respect to the diameter for clarity.

Fig. 3 is a normal, full size scale top view of the combination shown in Fig. 1 at normal free inside diameter which is slightly less or approximately equal to the piston head diameter as shown by the dotted reference circle.

Fig. 4 is an enlarged cross-sectional view taken along the line 4—4 in Fig. 3 through the primary bond area and shows the corrugated spacer element having one radial side wall formed at an angle for torsion control. The view shown is taken at normal free inside diameter as are all the following cross-sectional views.

Fig. 5 is an enlarged cross-sectional view of a modified form similar to Fig. 4 having a pretorsioned form or shape at free inside diameter before being contracted.

Fig. 6 is a side elevational view of a compression ring at free inside diameter showing the wide gaps in staggered positions in relation to the primary bond marked by the "X"; the width of the ring is shown enlarged with respect to the diameter for clarity.

Fig. 7 is an enlarged cross-sectional view taken along the line 7—7 in Fig. 6 through the primary bond area and shows the sealing elements having different radial wall thicknesses for area control of frictional reaction between the elements.

Fig. 8 is an enlarged cross-sectional view of a modified form similar to Fig. 7 having the top sealing element plated with hard chrome and the lower elements plated with a bronze alloy or equivalent coating on a one piece ring assembly.

Referring now to the drawings in detail, it will be seen that the embodiment of the invention which has been illustrated in Figs. 1 to 4, piston ring construction A, comprises three sealing elements 1, 2, and 3 having gaps 4, 5, and 6, respectively, therein positioned in staggered formation and bonded together at a point 7 between the gaps. This primary bond, which is indicated by the mark "X," permits each of the sealing elements to retain its individual control of operation even though said bond creates a positive instantaneous opposed and alternating frictional reaction between the adjacent elements over their area of contact. The different areas of contact collectively develop a total frictional force in the assembled ring. A corrugated spacer element 8 having a gap 9 is provided for primary oil drainage. This spacer element 8 is formed with an angle $a$ to control the torsion of the ring as indicated by the direction of the arrow T in Fig. 4. The spacer element 8 is preferably supported and controlled by the adjacent sealing element 3 to which it is bonded at points 10 and 11 so that the gaps 6 and 9 are in alignment as shown in Fig. 2. This secondary twin bond 10 and 11, indicated by the marks "X," does not interfere with the reaction created by the primary bond in operation.

The sealing elements 1, 2, and 3 are provided with bevel portions 12, 13, and 14 respectively to provide high unit pressure contact surfaces and oil collecting channels 15, 16, and 17 which collects oil resulting from the scraping action. The oil collected in said channels filters radially inwardly between said sealing elements and drains through holes in the bottom of the piston ring groove.

The unusually large free inside diameter of the assembled ring as shown in Fig. 3 is slightly less or approximately equal to the piston head outside diameter, which is indicated by the dotted reference circle 18. Any desired combination of plating or coating may be applied to the sealing elements 1, 2, and 3 to provide the most compatible sealing and wearing relationship with the cylinder wall.

A modified piston ring construction B is shown in Fig. 5. Piston ring B comprises three sealing elements 1b, 2b, and 3b having gaps therein positioned in staggered formation and bonded together as in piston ring A, hereinbefore described and shown. The sealing elements 1b, 2b, and 3b are angularly disposed, as indicated by the angle b, so as to pretorsion the assembled ring at its free inside diameter, thereby increasing the frictional reaction between said sealing elements as the ring is contracted to cylinder diameter. This is a very effective form of preloading the ring. The contact face 19 of the upper sealing element 1b and the contact face 21 of the lower sealing element 3b are plated with a bronze alloy, and the intermediate contact face 20 of the element 2b is coated with a fast wearing surface such as iron and manganese phosphate or cadmium.

The torsion is controlled in the same manner as in ring A. The ring B is provided with a corrugated spacer element 8b having a gap therein, said spacer element 8b being bonded to said sealing element 3b by means of twin bonds adjacent the aligned gaps as in ring A.

The corrugated spacer element 8b is preferably formed originally at its normal operating diameter, then expanded to the free inside diameter of the adjacent sealing element 3b and bonded thereto by the secondary twin bond with the gaps in alignment, after which the sealing elements are assembled with their gaps in a staggered formation and bonded together by the primary bond at one point between the gaps for the purposes herein described.

The piston ring construction C shown in Fig. 6 has four sealing elements 22, 23, 24, and 25 with their gaps 26, 27, 28, and 29, respectively, positioned in a staggered formation and bonded together at a point 30, indicated by the mark "X," between the gaps which permits each element to retain its individual control of operation, even though the bond 30 creates a positive instantaneous opposed and alternating frictional reaction between the elements over their areas of contact. As shown in Fig. 7, the upper sealing element 22 and the third sealing element 24 have curved contact faces 31 and 33, respectively, which are plated with hard chrome providing a high circumferential pressure with a very low rate of wear, i. e., very slow wearing or break-in characteristics, of the sealing surface. The second sealing element 23 and the lower sealing element 25 have reduced radial wall thicknesses to provide a lower circumferential pressure on their sealing faces 32 and 34, respectively, which are plated or coated with a softer material having a normal rate of wear, i. e., fast wearing or break-in characteristics, to develop a concentric circularity and intimate sealing contact with the cylinder wall. The purpose of the plated construction C is to provide chrome plated elements acting as secondary sealing faces, which eliminates the costly face lapping or preseating operation in manufacture. The adjacent softer plated elements act as primary sealing faces developing intimate sealing relationship with the cylinder wall very quickly. The assembled ring produces an unusual sealing action collectively developed. The difference in the radial wall thicknesses of the sealing elements provides area control of frictional reaction between the sealing elements due to torsion as indicated by the direction arrow T. This combination in a one piece ring assembly produces a ring having a highly effective reaction as wear increases which substantially prolongs the efficient service life of the ring.

The piston ring construction D shown in Fig. 8 is a modified form of the bonded ring shown in Fig. 7 and has three sealing elements 37, 38, and 39 with tapered faces 40, 41, and 42, respectively, thereon. The top sealing element 37 has a hard chrome plated face 43 thereon. The intermediate and lower sealing elements 38 and 39 have softer bronze alloy plated faces 44 and 45 to create a one piece ring assembly providing an unusual combination of compatible sealing and wearing relationships with the cylinder wall. As shown, the lower sealing element 39 has a reduced radial wall thickness to provide lower circumferential pressure on the sealing face. The difference in the radial wall thicknesses provides area control of frictional reaction between the sealing elements due to torsion as indicated by the direction arrow T in the same manner as shown in Fig. 7.

The primary bond, which is indicated by the mark "X" in the various constructions, is formed preferably by welding. An anode is placed on the upper surface of the upper sealing element and another anode on the lower surface of the lower sealing element or spacer element toward the inside diameter thereof. A current is then directed from one anode to the other thereby welding all of said elements together at one selected point as shown. The weld or bond extends radially outwardly from the inside diameter to approximately the position of the dotted line W—W shown in the cross-sectional views, leaving the outer portion or circumference free to stretch and flex in operation.

The various sealing elements disclosed herein may be combined with each other and/or a spacer element in different combinations without departing from this invention. That is, each element can be selected for certain individual or collective characteristics. The radial wall thicknesses and widths of the different elements can be varied as desired. Similarly, the shapes and coating materials of the contact faces may be combined in different manners according to the results desired. No expander elements are necessary with rings of this sort which provide improved operation. The unusually large free inside diameter, which is slightly less than the outside diameter of the piston head, combines high circumferential unit pressure with high torsion control and frictional reaction between the elements. All the elements may be individually plated or coated before being assembled in a desired combination. The elements are then bonded to form a one piece ring assembly for the purposes herein described. The assembled ring when in operating position in the cylinder does not have the usual uniform axial side clearance in the piston ring groove because of the high torsion control of the ring and does not have contact with the bottom of the piston ring groove in operation. The elements may be pretorsioned when desired to increase frictional reaction with uniform circumferential control of resistance to collapse. This is a form of preloading the assembled ring at its free inside diameter before said ring is contracted to cylinder diameter. The constructions shown provide very effective sealing and blowby control over present types of rings in operations.

In operation, the rings hereinbefore described do not depend on a radial expanding force alone, but depend on a combination of radial expanding force and a controlled circumferential contracting torsional action in which there is developed an instantaneous opposed frictional reaction between adjacent elements. Conventional sealing elements in operation depend on expanding radial force which becomes greatly reduced as wear increases so that their life of efficient service is reduced. When wear appears on the face contacting surfaces of the constructions hereinbefore described, the shape of the cylinder, which is nonuniform because of wear, controls the circumferential contracting action of the sealing elements and regulates the instantaneous opposed frictional reaction to changes in the diameter and shape of the cylinder wall so that the greater the wear and changes in the cylinder wall, the greater the winding and unwinding movement of the elements, and therefore, the greater the instantaneous opposed frictional reaction force in the ring. The frictional reaction force developed provides recompense for any loss of the original radial expanding force of the ring that may occur throughout the service life of the ring. The frictional reaction is alternating in operation since it increases on the down stroke of a piston and decreases on the up stroke due to torsion action and taper in the cylinder bore.

It may be useful to further explain the terms torsion and pretorsion and their degree of action as a controlling factor in the operation of the piston rings described herein. The standard practice in the industry with regard to sealing elements not made in accordance with the present invention is to roll said elements to a free outside diameter of .050 to .070 inch greater than or over the cylinder diameter. Upon contraction to cylinder diameter in a piston ring groove, these sealing elements develop only a slight torsional effect which produces little if any side contact pressure between adjacent elements and minimum frictional effect in operation.

In contrast, the torsion sealing elements made in accordance with the present invention are rolled to a free outside diameter of .125 to .175 inch greater than or over the cylinder diameter. Upon contraction to cylinder diameter in a piston ring groove, these new sealing elements develop positive torsion action which produces side pressure contact between adjacent elements with a usable degree of alternating frictional reaction therebetween when in operation, which may be described as torsion control of the bonded assembly.

With pretorsioned sealing elements as shown in Fig. 5, the torsion action hereinbefore referred to is further increased since the sealing elements are contracted to cylinder diameter in a piston ring groove thereby increasing the side contacting pressure between the sealing elements. When rolling the sealing elements to a free diameter in the pretorsioned form, the angle *b* of the radial wall is such that one edge of the element is between .015 and .035 inch vertically below the other edge. The torsion action thus developed also increases the radial pressure of the sealing elements in contact with the cylinder wall. Therefore, this torsion action produces high torsion control of the assembled sealing elements when in operation.

When the ring A shown in Fig. 4 is in operation and assembled or compressed in a piston ring groove, the sealing elements 1, 2 and 3 of ring A dish and assume a slanted or angular position wherein the inner edges thereof are lower than the outer edges substantially like the position of the sealing elements 1*b*, 2*b*, and 3*b* shown in Fig. 5. In this operating position of the ring A, the sealing elements cause the bottom of the spacer element 8 to lie flatly against the lower side of the piston ring groove thereby closing or reducing the angle *a* substantially to zero. Thus, the ring A torsions as shown by the arrow T in Fig. 4 to the position described. The angle *a* gives the direction of torsion to the sealing elements 1, 2 and 3.

In the ring B, the sealing elements are pretorsioned and bonded together. With the pretorsioned ring B shown in its free state in Fig. 5, in operation and when assembled and compressed in a piston ring groove, the sealing elements 1*b*, 2*b* and 3*b* maintain substantially the same dished or torsion position shown in Fig. 5 wherein the inner edges thereof are lower than the outer edges due to their contact with the angularly formed upper side of the spacer 8*b* which provides clearance at the angle *b* as shown for torsion movement in one direction only. In this operating position of the ring B, the bottom of the spacer element 8*b* lies flatly against the bottom side of the piston ring groove. The pretorsioning of sealing elements of the ring B simply adds an additional amount of stress or torsion to what would be inherent in a ring such as ring A. Thus, within the space or clearance in which a ring is allowed to torsion, the pretorsioned ring B is stressed to a greater degree than would a ring which has not been pretorsioned. This greater or additional stress is due to the pretorsion.

What is claimed is:

1. A piston packing ring comprising a plurality of concentric annular torsion sealing elements, each of said elements having a gap therein, said gaps being positioned in a staggered formation, said elements being bonded together at a point between said gaps, said elements developing an instantaneous opposed and alternating frictional reaction between their adjacent surfaces upon circumferential contraction and expansion of the assembled ring during operation.

2. A piston packing ring comprising at least three concentric annular torsion sealing elements, each of said elements having a gap therein, said gaps being positioned in a staggered formation, said elements being bonded together at a point between said gaps, said elements developing an instantaneous opposed and alternating frictional reaction between their adjacent surfaces upon circumferential contraction and expansion of the assembled ring during operation.

3. A piston packing ring comprising a plurality of annular sealing elements, each of said elements having a gap therein, said gaps being positioned in a staggered formation, said elements being bonded together at one point between said spaced gaps, said sealing elements having differently plated individual contact contours to combine different degrees of hardness and wearing characteristics for collectively developing contact sealing relationship.

4. A piston packing ring comprising a plurality of concentric annular split torsion sealing elements and an annular split vented spacer element, said elements being positioned one above another in flat contacting relation with their gaps positioned in a staggered formation, said elements being bonded together at one point between said spaced gaps.

5. A piston packing ring comprising a plurality of concentric annular torsion sealing elements, each of said elements having a gap therein, said gaps being positioned in a staggered formation, and a split corrugated spacer element, all of said elements being bonded together at one point between said gaps, said spacer element being bonded to the adjacent sealing element with gaps thereof in alignment.

6. A piston packing ring comprising at least three concentric annular pretorsioned sealing elements, each of said elements having a gap therein, said gaps being positioned in staggered formation, said elements being bonded together at one point between said spaced gaps to create a positive instantaneous opposed and alternating frictional reaction between said elements over their area of contact, wherein said sealing elements are pretorsioned at their free inside diameter, said inside diameter being slightly less than the outside diameter of the piston head to increase the frictional reaction between said elements.

7. A piston packing ring comprising a plurality of concentric annular split torsion sealing elements and a split vented spacer element, said elements being positioned one above another in flat contacting relation, said elements having their gaps positioned in staggered formation, said elements being bonded together at one point between said spaced gaps, said spacer element being corrugated and having sections of the radial wall angularly formed to develop torsion action in said sealing elements.

8. A piston packing ring comprising a plurality of concentric annular split sealing elements and a split vented spacer element, said elements being positioned one above another in flat contacting relation, said elements having their gaps positioned in staggered formation, said elements being bonded together at one point between said spaced gaps, said sealing elements being pretorsioned at their free inside diameter, said inside diameter being slightly less than the outside diameter of the piston head to increase the frictional reaction between the elements.

9. A piston packing ring comprising a plurality of annular torsion sealing elements lying in concentric relation to each other, each of said elements having a gap therein, said gaps being spaced in a staggered formation, said elements being bonded together at one point between said spaced gaps, said bonded elements forming a unitary intimate contacting torsioned assembly.

10. A piston packing ring comprising a plurality of annular torsion sealing elements lying in concentric relation to each other, each of said elements having a gap therein, said gaps being spaced in a staggered formation, said elements being bonded together at one point between said spaced gaps, said bonded elements forming a unitary intimate contacting torsioned assembly, said assembly collectively developing instantaneous alternating frictional reaction between adjacent elements.

11. A piston packing ring comprising a plurality of annular pretorsioned sealing elements lying in concentric relation to each other, each of said elements having a gap therein, said gaps being spaced in a staggered formation, said elements being bonded together at one point between said spaced gaps, said bonded elements being preloaded thereby forming a unitary intimate contacting pretorsioned assembly at free diameter.

12. A piston packing ring comprising a plurality of annular torsion sealing elements and a vented spacer element lying in concentric relation to each other, each of said elements having a gap therein, said gaps being spaced in a staggered formation, said elements being bonded together at a point between said spaced gaps, said bonded elements forming a unitary intimate contacting torsioned assembly.

13. A piston packing ring comprising a plurality of annular torsion sealing elements and a vented spacer element lying in concentric relation to each other, each of said elements having a gap therein, said gaps being spaced in a staggered formation, said elements being bonded together at a point between said spaced gaps, said bonded elements forming a unitary intimate contacting torsioned assembly, said assembly collectively developing instantaneous alternating frictional reaction between adjacent elements.

14. A piston packing ring comprising a plurality of annular pretorsioned sealing elements and a vented spacer element lying in concentric relation to each other, each of said elements having a gap therein, said gaps being spaced in a staggered formation, said elements being bonded together at a point between said spaced gaps, said bonded elements being preloaded thereby forming a unitary intimate contacting pretorsioned assembly at free diameter.

15. A piston packing ring comprising a plurality of annular torsion sealing elements and a vented spacer element lying in concentric relation to each other, each of said elements having a gap therein, said gaps being spaced in a staggered formation, said elements being bonded together at a point between said spaced gaps, said bonded elements forming a unitary intimate contacting torsioned assembly, said vented spacer element being axially rigid and having one radial side wall angularly formed to develop torsion action in said sealing elements.

16. A piston packing ring comprising at least three concentric annular torsion sealing elements, each of said elements having a gap therein, said gaps being positioned in staggered formation, said elements being bonded together at one point between said gaps to create a positive instantaneous opposed and alternating reaction between said elements over their area of contact, the gap of one sealing element being on the opposite side of said bond from the gap of the adjacent sealing element, said sealing elements having different radial wall thicknesses providing area control of frictional reaction between said sealing elements, said sealing elements having different individual contact face contours to provide effective action of each element in operation.

17. A piston packing ring comprising a plurality of concentric annular pretorsioned sealing elements, each of said elements having a gap therein, said gaps being positioned in a staggered formation, said elements being bonded together at a point between said positioned gaps, said elements developing an instantaneous opposed and alternating frictional reaction between their adjacent surfaces upon circumferential contraction and expansion of the assembled ring during operation.

18. A piston packing ring comprising a plurality of concentric annular torsion sealing elements, each of said elements having a gap therein, said gaps being positioned in a staggered formation, said elements being bonded together at a point between said positioned gaps, the gap of one sealing element being on the opposite side of said bond from the gap of the adjacent sealing element, said elements developing an instantaneous opposed and alternating frictional reaction between their adjacent surfaces upon circumferential contraction and expansion of the assembled ring during operation.

References Cited in the file of this patent

UNITED STATES PATENTS

| | | |
|---|---|---|
| 1,103,912 | Dunham | July 14, 1914 |
| 1,357,392 | Fuchs, Jr. | Nov. 2, 1920 |
| 2,030,927 | Marien | Feb. 18, 1936 |
| 2,068,114 | Solenberger | Jan. 19, 1937 |
| 2,091,947 | Cords | Aug. 31, 1937 |
| 2,111,291 | Mason | Mar. 15, 1938 |
| 2,579,697 | Phillips | Dec. 25, 1951 |
| 2,609,260 | Marien | Sept. 2, 1952 |

FOREIGN PATENTS

| | | |
|---|---|---|
| 13,877 | Great Britain | June 16, 1914 |
| 512,360 | Great Britain | Sept. 1, 1939 |